Figure 1:
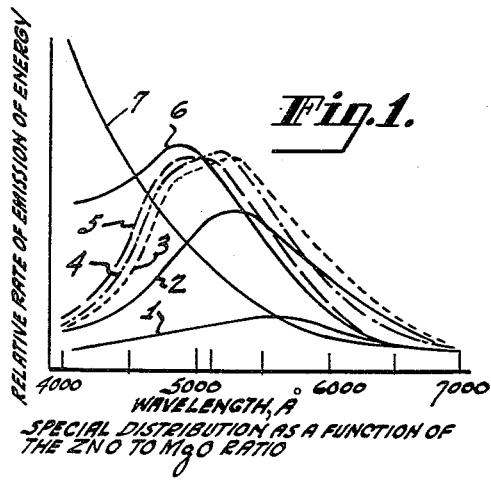

July 13, 1954  P. R. CELMER, JR  2,683,693
ZINC-MAGNESIUM OXIDE LUMINESCENT MATERIALS
Filed Feb. 14, 1951

SPECIAL DISTRIBUTION AS A FUNCTION OF THE ZNO TO MgO RATIO

INVENTOR
PHILIP R. CELMER, JR.
BY
ATTORNEY

Patented July 13, 1954

2,683,693

UNITED STATES PATENT OFFICE 2,683,693

ZINC-MAGNESIUM OXIDE LUMINESCENT MATERIALS

Philip R. Celmer, Jr., Trenton, N. J., assignor to Radio Corporation of America, a corporation of Delaware Application February 14, 1951, Serial No. 210,978

14 Claims. (Cl. 252—301.6)

This invention relates to improved luminescent materials of the oxide type and to improved methods of preparing certain oxide type luminescent materials. More particularly, the invention relates to improved phosphors composed of ZnO having certain proportions of MgO in solid solution, also having any of scandium, yttrium, lanthanum, or europium as activators, and to methods of preparing these materials.

PRIOR ART MATERIALS

Luminescent pigments have previously been prepared by firing a minor amount of magnesium oxide with zinc oxide and a small amount of lithium sulfate in a reducing atmosphere. Although these pigments have been reported to exhibit strong fluorescence under 2537 Å. or 3650 Å. ultraviolet excitation, their luminescence under cathode ray excitation is apparently relatively weak.

Zinc oxide containing small amounts of either zinc or sulfur has also been found to have luminescent properties. This phosphor usually has a broad greenish emission with a peak at 4900 Å.

Non-activated magnesium oxide is not luminescent when fired in either a hydrogen atmosphere or an oxygen atmosphere. Certain activators may be added to magnesium oxide to render it luminescent, however, although the emission efficiency is very low under cathode ray excitation.

SUMMARY OF THE PRESENT INVENTION

The present invention relates specifically to luminescent materials composed of zinc oxide and magnesium oxide with at least one of the elements scandium, yttrium, lanthanum, and europium present in activator proportions. These materials are prepared by firing the oxides, or materials which thermally decompose to form the oxides, in an oxidizing atmosphere. It is also preferred to use a flux which has a luminescence-intensifying action in firing the materials. In general, a flux material is used in which sodium is the metallic ion. Halides and phosphates of sodium have been found especially suitable.

OBJECTS OF THE INVENTION

One object of the present invention is to provide improved oxide type luminescent materials exhibiting relatively high luminescence efficiency under cathode ray excitation.

Another object of the invention is to provide improved oxide type luminescent materials having rapid decay rate characteristics.

Another object of the invention is to provide improved oxide type luminescent materials having broad-band emission characteristics.

A further object of the invention is to provide a novel series of oxide type luminescent materials which may have their emission spectra controlled by varying the proportion of activator or by varying the activator element, itself.

A further object of the invention is to provide improved methods of preparing zinc-magnesium oxide type phosphors.

A further object of the invention is to provide improved oxide type phosphors having good stability.

A further object of the invention is to provide improved oxide type phosphors having relatively high luminescence efficiency when excited by ultraviolet energy.

A still further object of the invention is to provide an improved oxide type phosphor suitable for black and white television kinescope tubes or flying-spot scanning.

These and other objects will be more apparent and the invention will be more readily understood from the following detailed description and the accompanying drawings of which:

ILLUSTRATIONS

Figure 2:
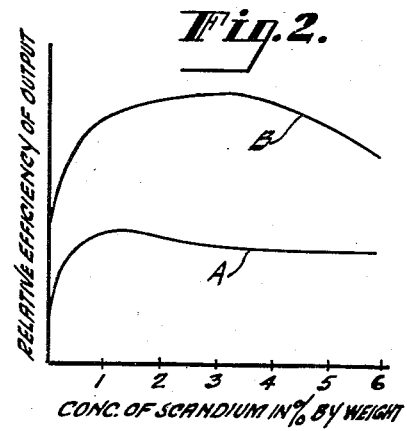
Figure 3:
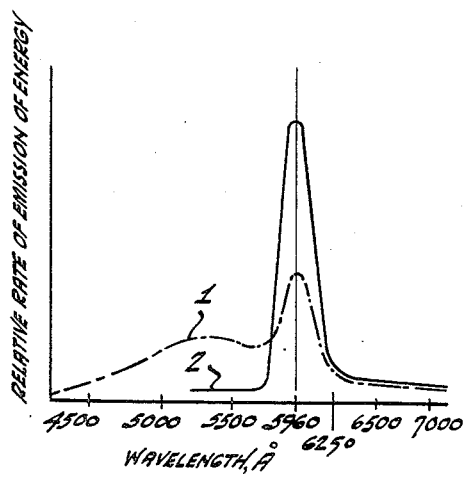
Figure 4:
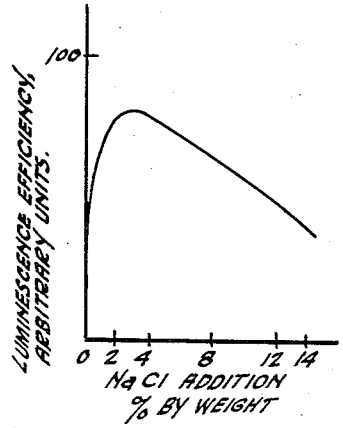

Figure 1 is a graph showing a family of curves of relative rate of emission of energy plotted against wavelength of emission for a number of different zinc-magnesium oxide phosphor compositions in which scandium is the activator and sodium chloride is the flux-intensifier, all of the materials being prepared in accordance with the teachings of the present invention, Figure 2 is a graph including two curves of relative efficiency of output plotted against concentration of scandium for a particular zinc-magnesium oxide composition, one of the curves being for output at 5100 Å. and the other being the uncorrected barrier-layer photocell response, Figure 3 is a graph similar to Fig. 1 showing two curves for different zinc-magnesium oxide phosphors activated with europium, and Figure 4 is a graph showing a curve of values obtained by plotting luminescence efficiency in arbitrary units against sodium chloride addition for a material consisting of a particular zinc-magnesium oxide composition activated with a particular percentage of scandium.

STRUCTURE OF THE PRESENT MATERIALS

The zinc-magnesium oxide luminescent materials of the present invention have been found to comprise magnesium oxide in solid solution in the zinc oxide. Evidence of this type of structure was obtained by photographing the X-ray diffraction patterns of films of various zinc-magnesium oxide compositions. The photographs showed only a pattern of hexagonal zinc oxide with the same lattice constant as found for activated zinc oxide prepared with a sodium compound flux-intensifier.

PREPARATION

In general, the improved materials of the present invention may be prepared by mixing zinc oxide, magnesium oxide, and a salt of at least one of the four activating elements scandium, yttrium, lanthanum, and europium either with or without a flux-intensifier comprising a sodium salt which is preferably any of the halides, i. e., chloride, bromide, iodide, or fluoride, or any of the phosphates including ortho, meta, and pyro.

The mixture is fired in an oxygen atmosphere at temperatures of about 900° C. to about 1350° C. for from about 1 to 60 minutes depending upon the size of the batch and the firing temperature. At 1000° C. the preferred firing time for small batches is from about 20 to about 60 minutes. At 1350° C. the preferred firing time is from about 1 to about 10 minutes. In general, maximum efficiency is achieved with a firing time of about 20 minutes at 1000° C. The principal reason for decreasing the firing time at higher temperatures is to prevent too great a loss of the more volatile constituents.

When the present materials are fired in oxygen, much better photo- and cathodo-luminescence efficiencies are obtained than when they are fired in nitrogen, hydrogen, or air.

The use of a flux-intensifier is also greatly preferred from the standpoint of obtaining materials having the maximum emission efficiencies.

Specific examples of preparation will now be given.

Example I

A scandium-activated luminescent material having sodium chloride as flux-intensifier was prepared by mixing the ingredients in the following proportions:

| | | |
|---|---|---|
| ZnO | g | 10.80 |
| MgO | g | 1.20 |
| NaCl | g | 0.24 |
| 0.76 molar Sc(NO$_3$)$_3$ | ml | 1.50 |

The resulting material may be expressed with the following molecular formula in which the numbers following the zinc and magnesium oxides stand for percent by weight of the total zinc-magnesium oxide content and the figures following the activator and flux-intensifier stand for percent by weight of the entire composition:

ZnO(90).MgO(10:Sc(2)[NaCl(2)]

The ingredients were mixed in the form of a water slurry, ball-milled for eight hours, dried, and fired at 1300° C. in an oxygen atmosphere containing steam, for 5 minutes. The firing took place in a combustion tube furnace through which oxygen was drawn at a flow rate of 150 cc./min.

The resulting product had a broad emission band having a red component greater than that of commercial zinc oxide phosphors.

Referring to Fig. 1, curve No. 3 shows the emission characteristic of the material prepared substantially as described in this example. Maintaining the activator and the flux intensifier concentration constant and varying the ZnO to MgO ratio produces materials with different spectral distribution of their emission. The correlation of curve No. and ZnO-MgO ratio is given in the following table.

TABLE I

| Curve No. | Composition |
|---|---|
| 1 | ZnO(100) |
| 2 | ZnO(95).MgO(5) |
| 3 | ZnO(90).MgO(10) |
| 4 | ZnO(80).MgO(20) |
| 5 | ZnO(70).MgO(30) |
| 6 | ZnO(60).MgO(40) |
| 7 | ZnO(50).MgO(50) |

In all cases the scandium and sodium chloride were each present in the amount of 2% by weight. Firing temperature was 1350° C., and firing time was 5 minutes in an oxygen atmosphere.

In general, the MgO may be present in the amount of from 5% to 60% by weight of the total ZnO-MgO content. Stated in another way the ZnO to MgO ratio may be from 19:1 to 2:3 by weight.

If the ZnO-MgO ratio and the percentage of flux-intensifier are kept constant, varying the percentage of rare earth activator will result in materials having varying relative efficiency of luminescence output as shown in the curves A and B of Fig. 2. Curve A shows how the relative light output at 5100 Å. varies as the percentage of scandium is increased. Percentages as low as 0.1% by weight produced a significant increase in luminescence. As the percentage was increased, the effect became more constant. Beneficial effects were observed when the percentage by weight of scandium was any value up to 6 although the preferred amount is about 2% by weight. Curve B is the relative luminescence output of these materials as measured by an uncorrected barrier-layer type photocell. Total luminescence, in this case, increases until up to about 3.5% by weight of scandium is added and beneficial results are obtained when using up to about 6%.

The materials whose luminescence characteristics are shown in the curves of Fig. 2 are compositions made up of ZnO(90).MgO(10):Sc($x$)[NaCl(4)]

They were all prepared by firing at 1200° C. in oxygen for 10 minutes. Excitation was by 6 kv. cathode rays at an intensity of 1 $\mu$a./cm.$^2$.

Changing the activator to one of the other three rare earth metals has the effect of shifting the peak emission to a different wavelength.

Example II

A material was made up using yttrium as activator, the composition being as follows:

| | | |
|---|---|---|
| ZnO | g | 9.60 |
| MgO | g | 2.40 |
| Na$_2$P$_2$O$_7$ | g | 0.25 |
| Y(NO$_3$)$_3$(2 M.) | ml | 0.25 |

This composition may also be expressed as:

ZnO(80).MgO(20):Y(2)[Na$_2$P$_2$O$_7$(2)]

This mixture was fired at 1300° C. in oxygen for 9 minutes and produced a luminescent product having a bluish-white, broad-band emission.

Example III

Another composition was made using lanthanum as the activator and sodium pyrophosphate ($Na_2P_2O_7$) as the flux-intensifier.

The required weights of each ingredient were dry mixed to form the composition:

ZnO(87).MgO(13):$LaF_3$(2.5) [$Na_2P_2O_7$(4)]

The mixture was first ground in a porcelain mortar to break up the lumps and then dry-rolled on a mill for eight hours. The mixture was then fired in a combustion-tube furnace in an atmosphere of oxygen (flow rate 150 cc./min.) at 1000° C. for 20 min.

The reflection color of the resulting product was white. With excitation by 2537 Å. or 3650 Å. ultraviolet energy this material had a broadband emission with a more intense red output than a ZnO:[Zn or S] phosphor. Under cathode ray excitation, for example at 6 kv. and an intensity of 3 μa./cm².ial, the material had peak emission at 5300 Å.

It was found that if $MgCO_3$ was used in place of MgO the luminescence efficiency was improved. It was also found that for this embodiment dry mixes gave better results than water slurries. Analytical reagent grade ZnO (dry process) and "Ultra Pure" $MgCO_3$ were used as raw materials.

Figure 3 shows two curves each of which is for a material having a different ZnO-MgO ratio but activated with the same amount, namely 1% by weight of europium oxide. The material of curve 1 was ZnO(70).MgO(30):$Eu_2O_3$(1) [NaCl(2)]. That of curve 2 was ZnO(50).MgO(50):$Eu_2O_3$(1). Both materials were prepared by firing in oxygen at 1300° C. for 5 minutes. The curves were obtained by bombarding with cathode rays at 6 kv. and 4μa./cm.² These spectral distribution curves indicate that the europium-activated material has a very narrow orange band of emission with its peak at about 5960 Å. The composition in which the ZnO-MgO ratio is 50:50 gives maximum peak efficiency.

In general, activator concentration should be at least .1% by weight of the total composition. From a practical standpoint, the upper limit is about 6% by weight, for all of the activators used in the present invention.

The use of a flux in preparing the materials of the present invention is of unusual importance since by proper choice of flux the luminescence efficiency can be increased by as much as 40%. For this reason, fluxes in the present case have been termed "flux-intensifiers." Out of the many different substances tested as flux-intensifiers for these materials, inorganic salts having a sodium cation were found to intensify the luminescence to greater or lesser degrees depending upon the particular anion present and the concentration of the flux material in the product. All of the common inorganic salts having a sodium cation, such as the carbonate, nitrate, nitrite, sulfate, and cyanide, have all been found to increase the luminescence efficiency to different though significant extents. All of the sodium halides and phosphates have been found best, as a group, although sodium bromide is least desirable of these. Many of the usual flux materials tested had the effect of poisons in that they decreased the luminescence efficiency of the product.

The effect on a particular scandium-activated zinc-magnesium oxide material of adding different percentages by weight of sodium chloride as a flux is shown in Fig. 4. This curve shows how luminescence efficiency is increased by adding from 0.1 to about 14% by weight sodium chloride to the composition ZnO(90).MgO(10):Sc(0.25)

and firing at 1200° C. in oxygen for 8 minutes. Preferred concentration of sodium chloride is about 2%. The useful ranges of the other materials which have proven useful as fluxes are about the same as that of sodium chloride.

The rate of oxygen flow for providing the oxygen firing atmosphere does not appear to be critical so long as sufficient oxygen is present to prevent reduction taking place. Flow rates of 50 to 150 cc./min. have proven to be practical.

In general, the materials of the present invention have relatively high efficiencies, broad-band emission and fast decay rates, making them suitable for black-and-white television kinescopes and flying-spot scanning tubes. They also have good stability in water. This permits their use in the conventional liquid settling processes used for making cathode ray tube screens. The new materials also have properties rendering them suitable for high-speed oscillographic recording.

Since the zinc-magnesium oxide phosphors of the present invention are also efficient under 2537 Å. and 3650 Å. ultraviolet excitation, they can be used in fluorescent lamps.

What is claimed is:

1. A luminescent material comprising magnesium oxide in solid solution in zinc oxide, the ratio of zinc oxide to magnesium oxide being within the range of 19:1 and 2:3, and including one of the elements selected from the class consisting of scandium, yttrium, lanthanum, and europium in activator proportions.

2. A luminescent composition comprising a zinc oxide-magnesium oxide base material in which the said two oxides are present in ratios within the range of 19:1 and 2:3, and including at least 0.1% by weight of an activator selected from the class consisting of scandium, yttrium, lanthanum, and europium.

3. A luminescent composition comprising a zinc oxide-magnesium oxide base material in which the said two oxides are present in ratios within the range of 19:1 and 2:3, and including from about 0.1% to about 6% by weight of an activator selected from the class consisting of scandium, yttrium, lanthanum, and europium.

4. A luminescent material comprising a zinc oxide-magnesium oxide base material in which the said two oxides are present in ratios within the range of 19:1 and 2:3, and including at least 0.1% by weight of an activator selected from the class consisting of scandium, yttrium, lanthanum, and europium, and at least 0.1% by weight of a flux-intensifier consisting of an inorganic salt of sodium.

5. A luminescent material comprising a zinc oxide-magnesium oxide base material in which the said two oxides are present in ratios within the range of 19:1 and 2:3, from about 0.1 to about 6% by weight of an activator selected from the class consisting of scandium, yttrium, lanthanum, and europium, and about 0.1 to 14% by weight of a flux intensifier consisting of an inorganic salt of sodium.

6. A material according to claim 5 in which said flux-intensifier is sodium chloride.

7. A material according to claim 5 in which said flux-intensifier is sodium pyrophosphate.

8. A material according to claim 5 in which said ratio is 9:1, the activator is scandium in the amount of 0.25% by weight, and the flux-intensifier is sodium chloride in the amount of 2% by weight.

9. A method of making a luminescent material comprising firing a mixture of zinc oxide and magnesium oxide in which said oxides are present in a ratio between 19:1 and 2:3 and at least 0.1% by weight of an activator selected from the class consisting of scandium, yttrium, lanthanum, and europium in an atmosphere of oxygen at a temperature of 900°–1350° C.

10. A method of making a luminescent material comprising firing a mixture of zinc and magnesium oxides in which said oxides are present in a ratio between 19:1 and 2:3, at least 0.1% by weight of an activator selected from the class consisting of scandium, yttrium, lanthanum, and europium, and at least 0.1% by weight of a flux-intensifier consisting of an inorganic sodium salt, in an atmosphere of oxygen at a temperature of 900°–1350° C.

11. A method according to claim 10 in which said activator is scandium, said flux-intensifier is sodium chloride, and said temperature is 1000° C.

12. A method of intensifying the luminescence of a base material consisting essentially of zinc and magnesium oxides in which said oxides are present in a ratio between 19:1 and 2:3, activated with an element selected from the group consisting of scandium, yttrium, lanthanum and europium, said method comprising firing at least 0.1% by weight of an inorganic sodium salt with said material in an oxygen atmosphere at a temperature of 900°–1350° C.

13. A method according to claim 12 in which said sodium salt is sodium chloride.

14. A method according to claim 12 in which said sodium salt is the pyrophosphate.

References Cited in the file of this patent

UNITED STATES PATENTS

| Number | Name | Date |
|---|---|---|
| 2,481,344 | Reimert | Sept. 6, 1949 |
| 2,544,236 | Reimert | Mar. 6, 1951 |